United States Patent [19]

Frydman et al.

[11] Patent Number: 4,470,906

[45] Date of Patent: Sep. 11, 1984

[54] APPARATUS FOR BIOLOGICAL WASTEWATER TREATMENT

[75] Inventors: Allen Frydman; Hans Reimann, both of Munich, Fed. Rep. of Germany

[73] Assignee: Linde Aktiengesellschaft, Wiesbaden, Fed. Rep. of Germany

[21] Appl. No.: 482,757

[22] Filed: Apr. 7, 1983

[30] Foreign Application Priority Data

Apr. 7, 1982 [DE] Fed. Rep. of Germany ....... 3213074

[51] Int. Cl.³ ............................................. C02F 1/04
[52] U.S. Cl. .................................... 210/150; 210/351
[58] Field of Search ............... 210/350, 351, 618, 616, 210/617, 671, 150, 151

[56] References Cited

U.S. PATENT DOCUMENTS

| 3,374,052 | 3/1968 | Fan et al. | 210/661 |
| 3,617,551 | 11/1971 | Johnston | 210/671 |
| 4,022,694 | 5/1977 | Fruman | 210/350 |
| 4,253,947 | 3/1981 | Fan et al. | 210/618 |
| 4,328,105 | 5/1982 | Arbuckle | 210/796 |

Primary Examiner—Benoît Castel
Attorney, Agent, or Firm—Millen & White

[57] ABSTRACT

For the biological purification of wastewater in a reactor in the presence of open-pore and compressible carrier material for biomass, the carrier material, prior to its use in the reactor, is loaded with bacteria, finely divided, inorganic and/or organic compounds, selected for wastewater purification, and is then either stored or used in the process, the loaded carrier being especially useful for decreasing the start-up time of a wastewater treatment plant.

3 Claims, 1 Drawing Figure

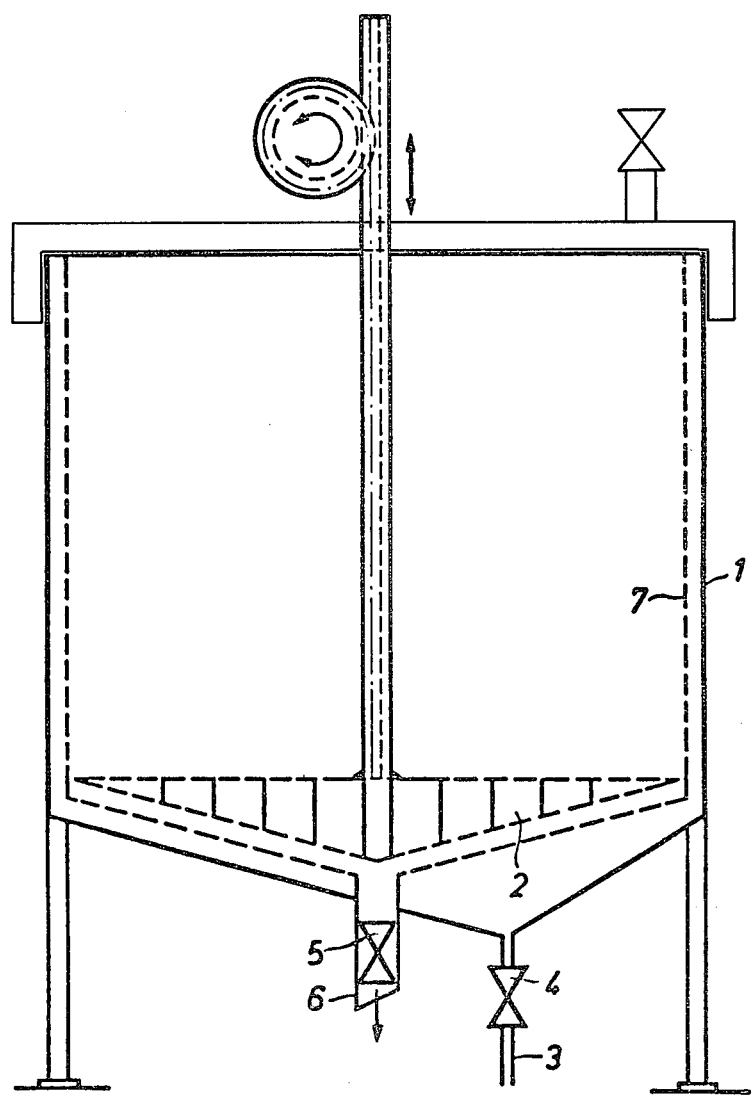

APPARATUS FOR BIOLOGICAL WASTEWATER TREATMENT

BACKGROUND OF THE INVENTION

This invention relates to an apparatus for the biological treatment of wastewater in the presence of open-pore and compressible carrier material for biomass.

As is known, the principle of inoculation is frequently employed when starting-up wastewater treatment plants, in order to shorten the start-up phase. THe wastewater treatment plant to be started-up is inoculated, as needed, with nitrifying bacteria (Nitrosomonas and Nitrobacter), anaerobic bacteria (anaerobes), or phosphate-degrading bacteria (Acinetobater). For this purpose, activated sludge from an already operating plant is utilized, for example, which sludge contains the appropriate bacteria. However, due to the slow multiplication of the bacteria, the start-up phase can stretch over several weeks, and such a long start-up phase is especially to be avoided when using carrier material for biomass.

SUMMARY OF THE INVENTION

Therefore, an aspect of one object of the present invention is to provide an apparatus of the above-described type so that the start-up phase for wastewater treatment plants with the use of carrier material is shortened in a simple and economical fashion.

The apparatus comprises, according to the invention, means for loading the carrier material, before its use in the reactor, with bacteria, finely divided, inorganic and/or organic compounds, selected for wastewater purification, and optimally prior to use means for storing the carrier material.

This invention is based on the discovery that carrier material which has been doped and/or loaded with bacteria and/or compounds is highly suitable for shortening the start-up phase of a wastewater treatment plant. By virtue of this invention, it is possible to shorten the start-up.

The doped carrier material is introduced into the reactor of the plant to be started-up, which reactor can be, for example, a circulating ditch, e.g., an oxidizing pond, an aeration tank a fluidized-bed or fixed-bed reactor, and the bacteria incorporated into the carrier material can immediately begin the breakdown of matter and at the same time can further multiply. In this connection, it is also of special advantage that the doped carrier material need not be utilized immediately after loading with the bacteria and/or compounds, but rather is stored first.

Another advantage of the invention resides in that the carrier material can be loaded not only with appropriate bacteria, but also with finely divided, inorganic and/or organic compounds. Suitable inorganic compounds are, for example, activated carbon and aluminium oxide. In this connection, activated carbon, due to its large active surface area, acts as a well-proven adsorbent for microorganisms, for substances contained in the wastewater, and for oxygen; and aluminium oxide serves as an adsorbent for specific material contained in the wastewater. Furthermore, silicic acid, rendered hydrophobic, can be incorporated into the carrier material as an adsorbent for fats and oils.

According to a further aspect of this invention, the loading of the carrier material is performed in the presence of the selected bacteria and/or compounds, distributed in water, by compression of the carrier material to exhaust air therefrom, and the subsequent expansion of the carrier material with the simultaneous adsorption of water, together with the selected bacteria and/or compounds, into the interior of the carrier material.

Preferably, the carrier material is compressed to about 10-30% of its original volume. It proved to be especially advantageous to repeat compression and expansion of the carrier material several times.

According to the apparatus aspect of this invention for loading the carrier material, said apparatus comprises a tank with a compression means, a charging device for the carrier material, connected to the tank, a feed conduit for the selected bacteria and/or compounds distributed in the water, as well as an outlet conduit for the loaded carrier material.

Especially when loading the carrier material with anaerobic bacteria, the tank is preferably of a sealed design, but preferably with means provided to remove air from the tank. Moreover, the compression means is especially advantageously designed to be a piston.

The invention can be utilized for starting-up any type of wastewater treatment plant. Moreover, the loaded carrier material can also be used for the rapid elimination of disturbances in a wastewater treatment plant, or basically for supporting the processes taking place in wastewater treatment plants.

Upon further study of the specification and appended claims, further objects and advantages of this invention will become apparent to those skilled in the art.

BRIEF DESCRIPTION OF FIGURE

The FIGURE is a schematically illustrated preferred embodiment of the invention.

DETAILED DESCRIPTION OF FIGURE

The FIGURE shows a tank 1 for loading carrier material, comprising a compression means 2 designed as a piston. The tank is filled, for example, to the halfway mark with an aqueous suspension containing the selected bacteria and/or compounds by way of a feed conduit 3 with valve 4. This suspension can be taken, for example, from any wastewater treatment plant in operation. Subsequently, valve 4 is closed and the carrier material is charged from the top. If the carrier material is to be loaded with anaerobic bacteria, the tank 1 is provided with a cover, and, comprising a sealable feed opening.

By lowering the piston 2, the flexible carrier material is compressed, preferably to 10-30% of its original volume, and simultaneously the air is squeezed out. During the subsequent lifting of the piston (expansion of the carrier material), the carrier material absorbs water, bacteria, finely divided, organic and/or inorganic compounds, which preferably settle in the interior of the carrier material. This process is preferably repeated several times, for example, two to three times.

Thereafter, valve 4 is opened in order to discharge the residual, unabsorbed sludge of the suspension. By opening valve 5 in an outlet conduit 6, the loaded carrier material can then be withdrawn from tank 1.

It is advantageous to provide the carrier material in comminuted form, so that it can be readily charged into tank 1 and/or discharged via conduit 6. To prevent discharge of the carrier material via conduit 3 together with the residual sludge, the tank 1 is preferably equipped with a screen retaining plate 7 for the carrier material.

After removal from tank 1, the loaded and/or doped carrier material can either be utilized immediately in the reactor of the wastewater treatment plant, or it is also possible first to store the loaded carrier material and subsequently transport same to the respective usage site.

Without further elaboration, it is believed that one skilled in the art can, using the preceding description, utilize the present invention to its fullest extent.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for loading an open pore compressible material with materials with which said open-pore compressible material is to be loaded, said apparatus comprising:

(a) tank means (1) for containing said carrier material to be loaded, and said tank means being sealed with cover means;

(b) compression means (2) associated with said tank means and comprising a piston for compressing and expanding carrier material contained in said tank means (1) and said piston arranged for being displaced within said tank means to compress said carrier material, when contained in said tank means, to 10-30% of the original volume of said carrier material;

(c) charge means for introducing said carrier material into said tank means, in relation to said piston, to be compressed and expanded thereby;

(d) conduit means (3) for feeding said materials, to be loaded into said carrier material, into said tank means into association with carrier material contained therein, with said materials to be loaded into said carrier being selected bacteria and/or compounds distributed in water, and said conduit means (3) being further for discharging residual materials not loaded into the carrier material;

(e) outlet conduit means (6) for removing loaded carrier material from said tank means;

(f) screen means (7) for preventing said carrier material from being discharged through said residual materials discharging conduit means (3) upon discharging of residual materials; and (g) first, second and third sealing means for sealing said tank means respectively associated with said charge means, feed conduit means (3) and outlet conduit means (6).

2. An apparatus as in claim 11 wherein said tank means contains said carrier material therein in comminuted form.

3. An apparatus as in claim 1 wherein said screen means comprises a screen retaining plate.

* * * * *